Dec. 15, 1970  H. E. STANFIELD  3,547,553
FLOATING SURFACE SKIMMER
Filed Dec. 30, 1968
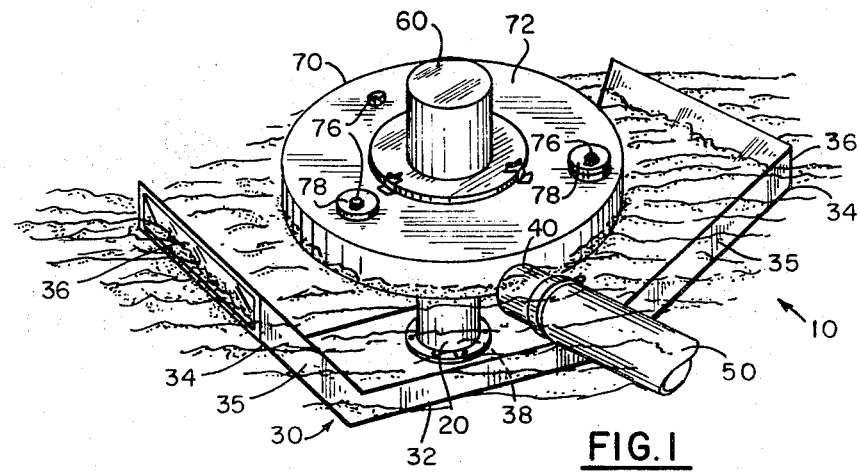
FIG. 1
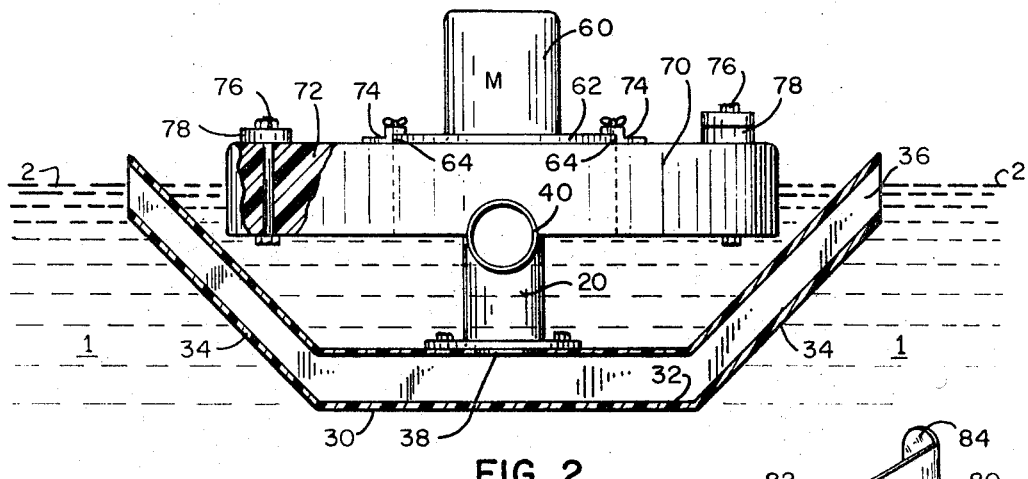
FIG. 2
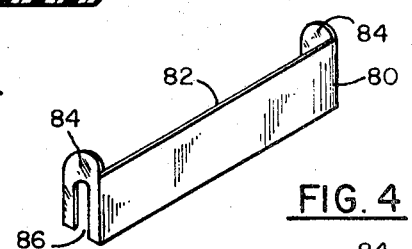
FIG. 4
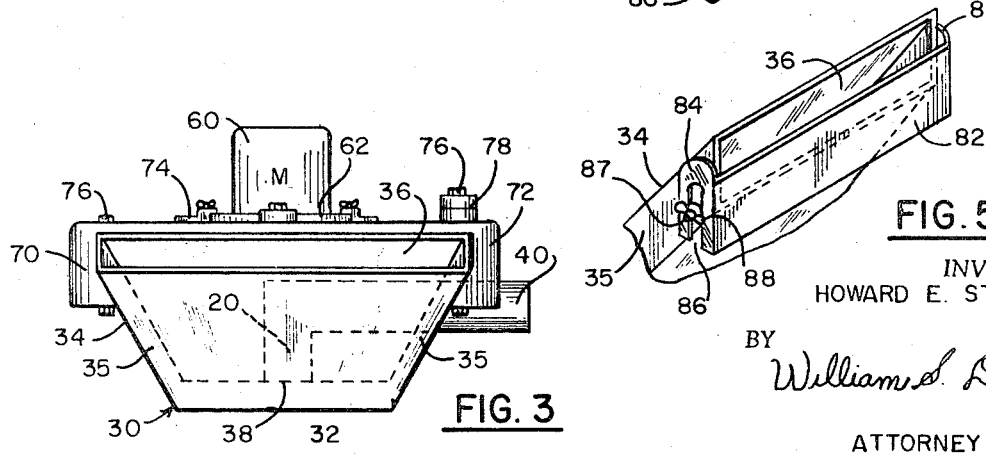
FIG. 3
FIG. 5
INVENTOR.
HOWARD E. STANFIELD
BY
William S. Dorman
ATTORNEY United States Patent Office 3,547,553
Patented Dec. 15, 1970

3,547,553
FLOATING SURFACE SKIMMER
Howard E. Stanfield, Tulsa, Okla., assignor to Acme Products Incorporated, a corporation of Nevada
Filed Dec. 30, 1968, Ser. No. 787,823
Int. Cl. F04d 13/02
U.S. Cl. 415—7                                    4 Claims

ABSTRACT OF THE DISCLOSURE

A floating pump assembly having intake scoops drawing from the surface layer only of a body or pool of liquid, and an exhaust outlet and hose for directing the removed layer to some other place than that of the body or pool of liquid itself.

---

The present invention relates to improvements in floating pumps and more particularly to a floating pump in combination with intake scoops whereby the contaminated surface of a body or pool of liquid may be skimmed off and expelled through an exhaust hose for removal from the body of liquid.

The surface of a pool or body of liquid, such as water, frequently becomes covered or contaminated with some lighter but undesirable matter, such as leaves and small debris, or petroleum, such as crude oil, or, following accidents, even refined hydrocarbons. It is usually desirable to remove such extraneous matter from the surface of the liquid bodies. One method of removing leaves and small debris from small bodies of water, such as swimming pools, is the clumsy and inconvenient method of capturing the debris by a well known netting process. Stationary skimming systems are available, but are generally dependent upon a fixed and constant surface level. Floating pumps are also available, but generally with intakes well below the surface of the liquid. And for such problems as oil slicks on larger bodies of water, such as the high seas, there is apparently no present solution, as unfortunately demonstrated by recent well-publicized accounts of oil tanker shipwrecks and subsequently contaminated beaches.

The present invention contemplates a novel floating pump which has been found capable of solving many of the current problems of surface contamination in liquid bodies. The inlet ends of the intake scoops encompass or are disposed at the very surface of the liquid, as opposed to being placed underneath the surface, and effectively draw in whatever happens to be floating on the surface, whether debris or an extraneous other liquid; and the apparatus' floating capacity allows it to adjust itself naturally to differences in surface levels. The unit may simply be placed into the liquid to be skimmed, and be kept there, or be pulled about, until the desired skimming off has been effected.

An important object of this invention is to provide a convenient means for skimming off the surface of bodies or pools of liquid, such as water, of unwanted surface material, such as small debris, or petroleum slicks.

It is an additional object of this invention to provide a surface-skimming means which need not be stationary, and which can naturally and automatically adjust itself to changes in surface level of the skimmed liquid.

Other and further objects and advantageous features of the present invention will hereinafter more fully appear in connection with a detailed description of the drawings in which:

FIG. 1 is a perspective view of the device;
FIG. 2 is a side elevational view;
FIG. 3 is an end elevational view;
FIG. 4 is a perspective view of an optional flow control feature (not shown in the previous figures); and
FIG. 5 is a perspective view of the optional device as attached.

Referring to the drawings in detail, reference numeral 10 refers generally to the complete skimming device. Its basic components are a pump 20, a pump intake means 30 drawing from the surface 2 of the liquid 1 in which the apparatus floats, a pumpage exhaust outlet 40, leading from the pump 20 to a connectable exhaust hose 50, a pump drive motor 60 and, attached to the housing of the motor, a float 70 which supports the entire apparatus 10.

The pump intake assembly 30 includes a horizontal central transverse duct member 32 from two opposite ends of which intake scoops 34 extend outward and upward to the surface 2 of the liquid 1 in which the device floats. Both the transverse member 32 and the intake scoops 34 are hollow ducts, all operably joined together so that there is liquid communication from the outer, or liquid inlet, ends 36 of the intake scoops 34, to the transverse member 32. The vertical side portions 35 of the intake scoops 34 are relatively upwardly diverging as best shown in FIG. 3.

In the center of the upper side of the transverse member 32 is an aperture or opening 38 leading directly upward to a pump 20. Details of the pump are not shown since the pump may be of any conventional variety (such as the impeller type). The pump is operably connected to, and driven by, a motor 60, which may be of any conventional type, such as an electric motor or an internal combustion engine (the details of which are not shown).

The pump 20 discharges through an outlet 40, which leads to the outside of the device, and into a connectable exhaust hose 50.

The entire apparatus is supported by a floating support ring 70 which may be constructed of reinforced Fiberglas, metal, or the like, and which also includes a hollow annular area 72 which may contain air, styrofoam, or other material which will give the support ring sufficient buoyancy to support the pumping unit in the floating position shown.

The float ring 70 supports the rest of the apparatus through a horizontal adapter ring 62, whose outer circumference 64 is removably attached to the inner side of the float ring 70, and whose inner side is permanently affixed about the housing of the motor 60. For convenience in removing the float ring 70 from the rest of the apparatus, the connection between the float ring 70 and the adapter ring 62 may be by means of removable clamps 74 or the like.

For adjusting the level of the device's buoyancy, and/or to adjust for balance, the float ring 70 may also be fitted with a plurality of bolts 76, or similar devices, to which sinking or leveling weights 78 may be attached.

The optional flow-control device, generally designated by reference numeral 80, is shown in FIG. 4 by itself and in FIG. 5 as attached to the inlet end 36 of an intake scoop 34. It may be constructed of any flat, rigid material, such as sheet metal or hard plastic. It corresponds generally with the size and shape of the inlet opening 36 of the intake scoop 34, and, thus, includes a central shielding member 82, at either end of which a flap 84 is folded back perpendicular from the central shielding member 82 so as to fit over the inlet end 36, and sides, of the intake scoop 34. Each flap contains an opening 86 which fits over or around a bolt 87 attached to the sides of the intake scoop. A wing nut 88 is received on the end of each bolt 87 for tightening the flaps to the end of the intake scoop. As shown here, this opening 86 is in the form of an elongated slot, so that the flow control device may be adjusted over the inlet of the intake scoope in a continuous plurality of positions.

As shown in the drawings, the inlet openings 36 are relatively wider in the horizontal direction and relatively narrower in the vertical direction. The flow control device 80 covers a variable portion of the lower part of the opening 36 so as to vary the vertical dimension of this opening, thereby limiting the thickness of the layer "scooped" from the surface of the liquid.

In the operation of the surface-skimming device, the device is simply placed in the body of liquid 1 to be skimmed. The float 70 buoys up the device so that the inlet ends 36 of the intake scoops 34 are disposed at, and include the surface 2 of the liquid 1. The surface layer 2 of the liquid 1 then flows through the inlets 36 of the intake scoops 34 into the central transverse ducts 32. When the pump 20 is activated by the motor 60, the surface liquids collected in the transverse duct 323 are drawn up through the opening 38 into the pump 20, and are discharged from the exhaust outlet 40, through exhaust hose 50, and to some remote place.

By means of the optional flow control device 80, the depth of the liquid surface layer 2 being skimmed off can be controlled by adjustment of the wing-nuts 88 and the central shield 82 so as to block the desired amount of the open area of the inlets 36 to the intake scoops 34.

In order to vary the overall floating depth of the device, and/or to adjust for balance, weights 78 may be attached to the bolts 76 on the float 70 until the desired level and/or balance is achieved.

Whereas the present invention has been described in particular relation to the drawings attached hereto, it should be understood that other and further modifications, apart from those shown or suggested herein, may be made within the spirit and scope of this invention.

What is claimed is:

1. Apparatus for skimming the surface of a body of liquid comprising a pump having an inlet and an outlet, hollow scoop means communicating at its upper open end with the surface of said liquid and at its lower end with the inlet of said pump, means for driving said pump, float means for buoyantly supporting said apparatus, means for varying the open area of the upper open end of said scoop means so as to vary the thickness of the layer skimmed from said surface, and an exhaust conduit connected to the outlet of said pump for directing the skimmed material to a remote location at the other end of said conduit.

2. Apparatus for skimming the surface of a body of liquid as set forth in claim 1 wherein said means to vary said open area includes a vertically adjustable shield attached to said scoop means and vertically movable to block off variable amounts of said open area.

3. Apparatus for skimming the surface of a body of liquid as set forth in claim 1 wherein said means to vary said open area includes regularly-spaced weight-attaching means for attaching weights thereto.

4. Apparatus for skimming the surface of a body of liquid comprising a pump having an inlet and an outlet, a float ring removably secured to the upper end of said pump and buoyantly supporting said apparatus in said liquid, a motor mounted on said apparatus for driving said pump, a horizontal hollow duct member disposed beneath said pump and having an opening therein communicating with the inlet of said pump, a pair of hollow intake scoops extending outwardly and upwardly from said horizontal duct member, said scoops having lower openings commumnicating with opposite ends of said duct member and having upper openings disposed at the surface of said liquid, flow control means connected to the upper ends of said scoops to vary the open area of said upper openings and to vary the thickness of the layer skimmed from said surface, and an exhaust conduit connected at one end to the outlet of said pump for directing the skimmed material to a remote location at the other end of said conduit.

References Cited

UNITED STATES PATENTS

| | | | |
|---|---|---|---|
| 2,827,268 | 3/1958 | Staaf | 103—87X |
| 3,142,281 | 7/1964 | Muller | 210—242X |
| 3,219,190 | 11/1965 | Thune | 210—242 |
| 3,273,507 | 9/1966 | Hardford | 103—87 |

ROBERT M. WALKER, Primary Examiner